United States Patent [19]

Henry

[11] Patent Number: 5,421,192
[45] Date of Patent: Jun. 6, 1995

[54] LEAK DETECTION IN HEATING, VENTILATING AND AIR CONDITIONING SYSTEMS USING AN ENVIRONMENTALLY SAFE MATERIAL

[75] Inventor: Richard G. Henry, Mayfield Heights, Ohio

[73] Assignee: Bright Solutions, Inc., Bloomfield Hills, Mich.

[21] Appl. No.: 312,772

[22] Filed: Sep. 27, 1994
(Under 37 CFR 1.47)

Related U.S. Application Data

[63] Continuation-in-part of Ser. No. 81,119, Jun. 25, 1993, Pat. No. 5,357,782.

[51] Int. Cl.$^6$ ............................................. G01N 37/00
[52] U.S. Cl. .................................... 73/40.7; 252/963; 252/962; 250/301
[58] Field of Search ......................... 73/40.7, 40.5; 250/301.16, 301.21, 301.36, 301; 252/964, 963, 962

[56] References Cited

U.S. PATENT DOCUMENTS

| | | | |
|---|---|---|---|
| 3,234,045 | 2/1966 | Larsen | 73/40.7 |
| 3,572,085 | 3/1971 | Packo | 73/40.5 |
| 4,690,689 | 9/1987 | Malcosky et al. | 48/174 |
| 4,758,366 | 7/1988 | Parekh | 252/68 |
| 5,149,453 | 9/1992 | Parekh | 252/68 |
| 5,167,867 | 12/1992 | Quaife et al. | 252/408.1 |
| 5,279,967 | 1/1994 | Bode | 436/56 |
| 5,357,782 | 10/1994 | Henry | 73/40.7 |

Primary Examiner—Hezron E. Williams
Assistant Examiner—J. David Wiggins
Attorney, Agent, or Firm—Robert J. Black

[57] ABSTRACT

The present invention relates to the effective leak detection of refrigerants by the addition of dyes from the general chemical class of naphthalimide fluorescent dyes in a refrigeration system where said refrigeration system employs alone, or in combination, a refrigerant in a hermetic system such as, but not limited to, chlorofluorocarbons (CFC), hydrochlorofluorocarbons (HCFC), hydrofluorocarbons (HFC) and any hydrogen, halogenated or ether derivatives of the methane, hydrogen, halogenated, ether or cyclic derivatives of either ethane, propane, butane, pentane, mixtures of HCFC, HFC, hydrocarbons, carbon dioxide and ammonia.

Leakage is determined by inspection of the sealed system using a lamp having an emission wavelength from 300 to 480 nanometers providing an indication of any system leakage.

15 Claims, No Drawings

LEAK DETECTION IN HEATING, VENTILATING AND AIR CONDITIONING SYSTEMS USING AN ENVIRONMENTALLY SAFE MATERIAL

This application is a continuation-in-part of my application entitled, "Leak Detection in Heating, Ventilating and Air Conditioning Systems Using an Environmentally Safe Material", U.S. Ser. No. 08/081,119, filed Jun. 25, 1993, and now U.S. Pat. No. 5,357,782 issued Oct. 25, 1994.

BACKGROUND OF THE INVENTION

1. Field of the Invention

The present invention relates to leak detection in refrigeration systems, and more particularly to effective leak detection by the addition of a dye selected from the general chemical class of naphthalimide fluorescent dyes in a refrigeration system where said refrigeration system employs, in combination with a suitable refrigerant system lubricant, a material, suitable to function as a heat transfer agent or refrigerant in a hermetic system.

2. Background Art

Refrigerants that are devoid of the chlorine atom and therefore considered environmentally friendly to the earth's ozone layer have been developed and continue to be developed to replace CFC and HCFC materials that are the circulating heat transfer media in many hermetic systems. Many chemical companies have developed products that alone or in combination are suitable to function as heat transfer agents or refrigerants in a hermetic system such as, but not limited to, hydrochlorofluorocarbons (HCFC), hydrofluorocarbons (HFC) and hydrogen, halogenated or ether derivatives of methane, hydrogen, halogenated, ether or cyclic derivatives of either ethane, propane, butane, pentane, mixtures of HCFC, HFC, hydrocarbons, carbon dioxide and ammonia. These forgoing HCFC, HFC and hydrocarbon refrigerants are considered less damaging to the environment and have ozone depletion potentials which range from zero to a fraction of one, while the ozone depletion potential of a CFC refrigerant, such as CFC-12, is one.

The use of these new alternative refrigerants has required the use of new kinds of refrigeration system lubricants such as synthetic polyalkylene glycols (PAG) and polyesters (POE) and has rendered prior leak detection chemicals employing materials such as those described in U.S. Pat. Nos. 4,758,366 and 5,149,453, issued on Jul. 19, 1988 and Sep. 26, 1992, respectively, as largely ineffective. These patents teach the use of perylene yellow fluorescent dyes formulated with mineral oils. Mineral oil is a hydrocarbon. Hydrocarbons such as synthetic hydrocarbons (SHC), alkylbenzene (AB), and polyalphaolefins (PAO) may only be partially soluble in polyalkylene glycol and in polyolester lubricants such as those used in the new HFC refrigerant-containing systems. The materials found in the above-referenced patents have been found unsuitable in actual systems tests and laboratory analytical tests for long term use in hermetic systems such as refrigeration, heating, ventilating and air conditioning systems employing the alternative HFC refrigerants. The reason for the unsuitability of these perylene dyes in HFC systems is primarily due to thermal chemical instability.

Some new HFC systems reach higher operating temperatures and pressures than the old CFC systems because of different thermodynamic properties. Such higher temperatures and pressures can adversely affect the thermal stability of the perylene dyes in the new HFC-containing systems. For these reasons, a new fluorescent dye composition for use in HFC systems that utilize refrigeration system lubricants such as mineral hydrocarbons, synthetic hydrocarbons, polyalkylene glycols and polyolesters is required.

SUMMARY OF THE INVENTION

Accordingly, it is the object of the present invention to provide an improved leak detection composition that incorporates a dye selected from the general chemical class of naphthalimide dyes into a refrigeration system lubricant where the refrigeration lubricant is suitable for use, alone or in combination with the dye, in refrigeration systems and includes, but is not limited to, hydrocarbons such as natural or refined mineral oils, synthetic hydrocarbons (SHC), alkylbenzenes (AB), polyalphaolefins (PAO) and synthetic polyalkylene glycols that are terminated as mono- or diethers or as esters, and the general class of polyolester lubricants that are either di-, tri-, tetra- or polyfunctional pentaerythritol esters. The formulation or mixture of a dye selected from the general chemical naphthalimide dye class with a suitable refrigeration lubricant and suitable lubricant. inhibitors will then be. incorporated into a refrigeration system with the objective of locating leaks that develop within the system from manufacture or use.

It has been found that the new leak detection dyes from the general chemical naphthalimide dye class described herein have excellent thermal and oxidation stability up to 400° F. and may be left inside the hermetic system for the location of leaks on future occasions. The general class of naphthalimide dyes disclosed is particularly intended for use alone or in combination with any material suitable to function as a heat transfer agent or refrigerant in a hermetic system. In practice, the combination of refrigerant, lubricant and dye will be circulated throughout the entire hermetic refrigeration system and the system will then be inspected for leaks with a light excitation source having emission wavelengths in the range from 300 to 480 nanometers.

The preferred composition disclosed herein is invisible or of a lessor intensity in ordinary light. When a lamp having a light emission output in the range from 300 to 480 nanometers is directed at the lubricant and naphthalimide dye mixture, a striking fluorescence, for example with the color yellow to yellow green, is immediately noticeable at the leak site.

DETAILED DESCRIPTION OF THE PREFERRED EMBODIMENTS

The present invention is directed to the detection of leaks in refrigeration systems employing the new alternative HFC environmentally friendly refrigerants where said refrigeration system is suitable for cooling, freezing, heating, ventilating and air conditioning and where said refrigeration system employs alone or in combination, any material, suitable to function as a heat transfer agent or refrigerant in a hermetic system such as, but not limited to, chlorofluorocarbons (CFC), hydrochlorofluorocarbons (HCFC), hydrofluorocarbons (HFC) and any hydrogen, halogenated or ether derivatives of methane, hydrogen, halogenated, ether or cyclic derivatives of either ethane, propane, butane, pentane, mixtures of HCFC, HFC, hydrocarbons, carbon dioxide and ammonia. Examples of the refrigerants include but are not limited to CFC-11, CFC-12, HCFC-22, HCFC-123, HCFC-124, HCFC-142B, HFC-32, HFC-134, HFC-134A, HFC-152, HFC-152A, HFC-143A, HFC-125, HFC-245CA, HFC-245FA AND HFC-225CA.

The refrigeration systems can use alone or in combination, refrigeration system lubricants including, but not limited to, hydrocarbons such as natural or refined mineral oils, synthetic hydrocarbons (SHC), alkylbenzenes (AB), polyalphaolefins (PAO) and synthetic polyalkylene glycols that are terminated as mono- or diethers or as esters, and the general class of polyolester lubricants that are either di-, tri-, tetra- or polyfunctional pentaerythritol esters.

The mixture of refrigerants and refrigeration system lubricants can be composed of the aforementioned materials having at least 0.001 grams of general naphthalimide dye structures that incorporate any nitrogen alkyl derivatives and any functionalized ring chemistry, both carbocyclic and heterocyclic, with either nitrogen, sulfur, carbon or oxygen dissolved per 100 grams of refrigeration working fluid.

It has been found desirable in most cases for the optimum fluorescent naphthalimide, obtained from natural or synthetic sources, to be solubilized by an appropriate solvent or solvent mixture to form a concentrate that is compatible with mineral oils, synthetic polyalkylene glycol and polyolester refrigerant lubricants. Therefore, the dye concentrate is formulated in a predetermined manner that has optimum lubricant and dye compatibility at elevated temperatures and which does not alter the refrigerant lubricant viscosity, lubrication and system materials compatibility as determined by the sealed tube method.

In a practical embodiment of the present invention a mixture of 1.5 grams of any general naphthalimide dye structure was individually mixed with 1 ounce of either mineral oil, polyalkylene glycol, and polyolester refrigeration lubricants. Approximately ¼ ounce of each of these dye mixtures was added to three different automotive air conditioning systems.

The dye and mineral oil mixture was added to a CFC-containing system. The CFC system was then charged with CFC-12 and approximately 7 fluid ounces of mineral oil lubricant were added to the system. The system was then operated for 5 minutes to allow the dye mixture to mix with the mineral oil. The system was then scanned with a lamp having a light emission output in the range from 300 to 480 nanometers to check for leaks. A greenish-blue color was seen at a pinpoint leak on a black EPDM hose. This greenish-blue color indicated a leak in the CFC system.

The dye and polyalkylene glycol mixture was added to the refrigeration system of a retrofitted automotive air conditioning system and the process of finding leaks was followed according to the above procedure. This time a green-yellow fluorescence was seen at the leak site after illumination with light.

The dye and ester mixture was added to the refrigeration system of an automotive air conditioning system and the process of finding leaks was followed according to the above procedure. This time a green-yellow fluorescence was seen at the leak site after illumination with light.

While but three embodiments of the present invention have been disclosed, it will be obvious to those skilled in the art that numerous modifications of the formulation can be made with dyes selected from the general class of naphthalimide dyes without departing from the spirit of the present invention which shall be limited only by the scope of the claims appended hereto.

What is claimed is:

1. A method of detecting leaks in a refrigeration system that uses in combination a refrigerant and a refrigeration system lubricant comprising the steps of:

preparing a mixture that consists of said refrigeration system lubricant mixed with a predetermined amount of a dye selected from the general class of naphthalimide dye structures as a fluorescent dye;

adding a predetermined amount of the mixture to said refrigerant for use in refrigeration system;

operating the system for a predetermined period of time to allow the mixture to mix with said combination of refrigerant and the refrigeration system lubricant;

examining the system for a leak site with a lamp that produces light having an emission wavelength from 300 to 480 nanometers, directed at said refrigeration system;

determining the presence of a leak site by the presence of a colored fluorescence detectable by visual observation under the light from said lamp at said leak site;

and said dye, refrigerant and refrigeration system lubricant mixture seeping thru and appearing at said location of leak site, the remaining at said site without undergoing chemical oxidation changes to provide capability for stable fluorescent indication of a leak.

2. A method of detecting leaks in a refrigeration system as claimed in claim 1 wherein:

said adding step consists of the addition of at least 0.001 grams of said mixture to a said refrigeration system for each 100 grams of said refrigeration lubricant.

3. A method of detecting leaks in a refrigeration system as claimed in claim 2 wherein:

said adding step-consists of the addition of at least 0.001 grams of said mixture to a system employing a mineral oil refrigerant lubricant for each 100 grams of said mineral oil refrigerant lubricant, 4. A method of detecting leaks in a refrigeration system as claimed in claim 2 wherein:

said adding step consists of the addition of at least 0.001 grams of said mixture to a system employing a polyalkylene glycol refrigerant lubricant for each 100 grams of said polyalkylene glycol refrigerant lubricant.

5. A method of detecting leaks in a refrigeration system as claimed in claim 2 wherein:

said adding step consists of the addition of at least 0.001 grams of said mixture to a system employing a polyol ester refrigerant lubricant for each 100 grams of said polyol ester refrigerant lubricant.

6. A method of detecting leaks in a refrigeration system as claimed in claim 1 wherein:

said mixture consists of at least 0.001 grams of fluorescent dye mixed with 100 grams of refrigeration system lubricant.

7. A method of detecting leaks in a refrigeration system as claimed in claim 6 wherein:

said mixture consists of 0.001 grams of fluorescent dye with 100 grams of mineral oil.

8. A method of detecting leaks in a refrigeration system as claimed in claim 6 wherein:

said mixture consists of 0.001 grams of naphthalimide dye with 100 grams of polyalkylene glycol.

9. A method of detecting leaks in a refrigeration system as claimed in claim 6 wherein:
said mixture consists of 0.001 grams of naphthalimide dye with 100 grams of polyol ester.

10. A method of detecting leaks in a refrigeration system as claimed in claim 1 wherein:
said mixture of a dye selected from the general class of naphthalimide fluorescent dyes and refrigeration system lubricant is allowed to remain in the refrigeration system for use in detecting possible future refrigeration system leaks.

11. A method of detecting leaks in a refrigeration system as claimed in claim 1 wherein:
said general class of naphthalimide dye structures incorporates nitrogen alkyl derivatives and functionalized ring chemistry, both carbocyclic and heterocyclic, selected from a group including nitrogen, sulfur, carbon and oxygen.

12. A method of detecting leaks in a refrigeration system as claimed in claim 1 wherein:
said refrigeration system is suitable for operation in a preselected mode including cooling, freezing, heating, ventilating and air conditioning.

13. A method of detecting leaks in a refrigeration system as claimed in claim 1 wherein:
said refrigeration system employs singly, or in combination, a refrigerant in a hermetic system, chosen from a group including chlorofluorocarbons (CFC), hydrochlorofluorocarbons (HCFC), hydrofluorocarbons (HFC), hydrogen, halogenated, and either derivatives of methane, hydrogen, halogenated, ether and cyclic derivatives of either ethane, propane, butane, pentane, mixtures of HCFC, HFC, hydrocarbons, carbon dioxide and ammonia.

14. A method of detecting leaks in a refrigeration system as claimed in claim 1 wherein:
said refrigeration lubricant in said refrigeration systems is selected from a group including hydrocarbons such as natural mineral oils, refined mineral oils, synthetic hydrocarbons (SHC), alkylbenzenes (AB), polyalphaolefins (PAO), synthetic polyalkylene glycols that are terminated as monoethers, diethers, esters, and a general class of polyester lubricants including either di-, tri-, tetra- or polyfunctional pentaerythritol esters.

15. A method of detecting leaks in a refrigeration system as claimed in claim 1 wherein:
said mixture is solubilized in the mixture preparation step by the addition of a solvent compatible with said refrigeration lubricant and said dye.

* * * * *